United States Patent
Schaedler et al.

(10) Patent No.: US 8,060,371 B1
(45) Date of Patent: Nov. 15, 2011

(54) SYSTEM AND METHOD FOR VOICE INTERACTION WITH NON-VOICE ENABLED WEB PAGES

(75) Inventors: Joseph Schaedler, Reston, VA (US); Arun Manroa, Herndon, VA (US); Ojas T. Choksi, Farmers Branch, TX (US)

(73) Assignee: Nextel Communications Inc., Reston, VA (US)

( * ) Notice: Subject to any disclaimer, the term of this patent is extended or adjusted under 35 U.S.C. 154(b) by 1067 days.

(21) Appl. No.: 11/746,189

(22) Filed: May 9, 2007

(51) Int. Cl.
*G10L 21/00* (2006.01)
(52) U.S. Cl. ............... 704/270.1; 704/275; 715/224
(58) Field of Classification Search ........... 704/270.1, 704/270–275; 715/224
See application file for complete search history.

(56) References Cited

U.S. PATENT DOCUMENTS

| | | | |
|---|---|---|---|
| 5,960,399 A * | 9/1999 | Barclay et al. ............ 704/270.1 |
| 6,101,472 A * | 8/2000 | Giangarra et al. ............ 704/275 |
| 6,101,473 A | 8/2000 | Scott et al. |
| 6,115,686 A | 9/2000 | Chung et al. |
| 6,157,705 A | 12/2000 | Perrone |
| 6,192,338 B1 * | 2/2001 | Haszto et al. ............ 704/257 |
| 6,212,535 B1 * | 4/2001 | Weikart et al. ............ 715/207 |
| 6,341,128 B1 | 1/2002 | Svedberg |
| 6,366,650 B1 | 4/2002 | Rhie et al. |
| 6,587,822 B2 | 7/2003 | Brown et al. |
| 6,604,075 B1 | 8/2003 | Brown et al. |
| 6,636,831 B1 | 10/2003 | Profit, Jr. et al. |
| 6,697,964 B1 * | 2/2004 | Dodrill et al. ............ 714/38 |
| 6,724,868 B2 | 4/2004 | Pradhan et al. |
| 6,745,163 B1 | 6/2004 | Brocious et al. |
| 6,754,181 B1 * | 6/2004 | Elliott et al. ............ 370/252 |
| 6,954,631 B2 | 10/2005 | Thiebot |
| 7,003,464 B2 | 2/2006 | Ferrans et al. |
| 7,027,975 B1 * | 4/2006 | Pazandak et al. ............ 704/9 |
| 7,054,818 B2 | 5/2006 | Sharma et al. |
| 7,062,709 B2 | 6/2006 | Cheung |
| 7,082,397 B2 | 7/2006 | Cohen et al. |
| 7,095,825 B2 | 8/2006 | James et al. |
| 7,120,702 B2 | 10/2006 | Huang et al. |
| 7,133,837 B1 | 11/2006 | Barnes, Jr. |
| 7,149,198 B2 | 12/2006 | Bui |
| 7,177,814 B2 * | 2/2007 | Gong et al. ............ 704/270.1 |
| 7,185,276 B2 | 2/2007 | Keswa |
| 7,216,351 B1 | 5/2007 | Maes |
| 7,373,598 B2 | 5/2008 | Vora |
| 7,389,236 B2 | 6/2008 | James |
| 7,406,658 B2 | 7/2008 | Brassell et al. |
| 7,509,260 B2 | 3/2009 | Cross et al. |
| 7,660,400 B2 | 2/2010 | Bangalore et al. |
| 2003/0139928 A1 | 7/2003 | Krupatkin et al. |
| 2003/0233400 A1 | 12/2003 | Pinal |
| 2004/0006474 A1 * | 1/2004 | Gong et al. ............ 704/270.1 |
| 2004/0128136 A1 | 7/2004 | Irani |
| 2004/0141597 A1 | 7/2004 | Giacomelli |
| 2005/0137875 A1 | 6/2005 | Kim et al. |
| 2005/0150944 A1 | 7/2005 | Melick et al. |
| 2005/0273487 A1 | 12/2005 | Mayblum et al. |
| 2006/0041893 A1 | 2/2006 | Castro et al. |

(Continued)

Primary Examiner — Vijay B Chawan

(57) ABSTRACT

Systems and methods for voice interaction with non-voice enabled web pages and browsers are provided. A communication unit that does not provide for voice enabled web browsing can be provided with a hardware and/or software plug-in. The plug-in can receive non-voice enabled web pages, receive voice from a user of the communication unit and provide the voice to a speech recognition server. The plug-in receives corresponding text from the speech recognition server and provides the text to a non-voice enabled web browser to fill-in form fields with the corresponding text.

17 Claims, 5 Drawing Sheets

U.S. PATENT DOCUMENTS

| | | |
|---|---|---|
| 2006/0064302 A1 | 3/2006 | Ativanichayaphong et al. |
| 2006/0143016 A1 | 6/2006 | Jones et al. |
| 2007/0050718 A1 | 3/2007 | Moore et al. |
| 2007/0052616 A1 | 3/2007 | Yoon |
| 2007/0100928 A1 | 5/2007 | Sylthe et al. |
| 2009/0254348 A1 | 10/2009 | Moore et al. |

* cited by examiner

SYSTEM AND METHOD FOR VOICE INTERACTION WITH NON-VOICE ENABLED WEB PAGES

CROSS-REFERENCE TO RELATED APPLICATIONS

This application is related to U.S. application Ser. No. 11/746,197, entitled "A MULTIMODAL GATEWAY FUNCTION FOR VOICE ENABLING FROM FIELDS", filed on even date herewith. The content of the above-referenced application is incorporated herein by reference.

BACKGROUND

The Internet has made it possible to access web sites to obtain information and conduct transactions using a browser. Browsers interpret and display web pages typically written in HyperText Markup Language (HTML). Recently web pages and browsers have been designed to provide a multimodal capability that includes a voice functionality for accessing and interacting with web pages. This is achieved by combining eXtensible HyperText markup Language (XHTML) with voice enablement markup language (Voice XML). Web pages and browsers that are compatible with this combination are typically referred to a X+V enabled.

While X+V enabled web pages and browsers make it easier to browse web pages on communication units with limited input mechanisms, such as the common twelve button keypad of voice communication units, there has been only limited adoption of X+V technology. Specifically, X+V technology typically requires web pages to be written in the X+V language and browsers must be capable of interpreting this language. Yet many, if not most, web pages today are written in basic HTML. Likewise, many communication units do not have the capability of interpreting web pages written in the X+V language. Therefore the ability to use voice and related multimodal technology still remains unavailable for many users.

SUMMARY OF THE INVENTION

Exemplary embodiments of the present invention overcome the above-identified and other deficiencies of conventional communication units by allowing voice interaction with non-voice enabled web pages and browsers. This voice interaction can be achieved using a software and/or hardware plug-in module. The voice interaction can include, for example, filling-in form fields on a web page using voice.

In accordance with exemplary embodiments of the present invention, a plug-in can receive a web page, modify an attribute of the web page and provide the web page with the modified attribute to an application, such as a web browser. The plug-in can receive voice information for a form field of the web page, provide the voice information to a speech recognition server, and receive text from the speech recognition server. The plug-in can provide the text into one or more form fields, and the form field information can be provided as text to a web server.

Other objects, advantages and novel features of the present invention will become apparent from the following detailed description of the invention when considered in conjunction with the accompanying drawings.

BRIEF DESCRIPTION OF THE DRAWING FIGURES

DETAILED DESCRIPTION OF THE PREFERRED EMBODIMENTS

Figure 1A:
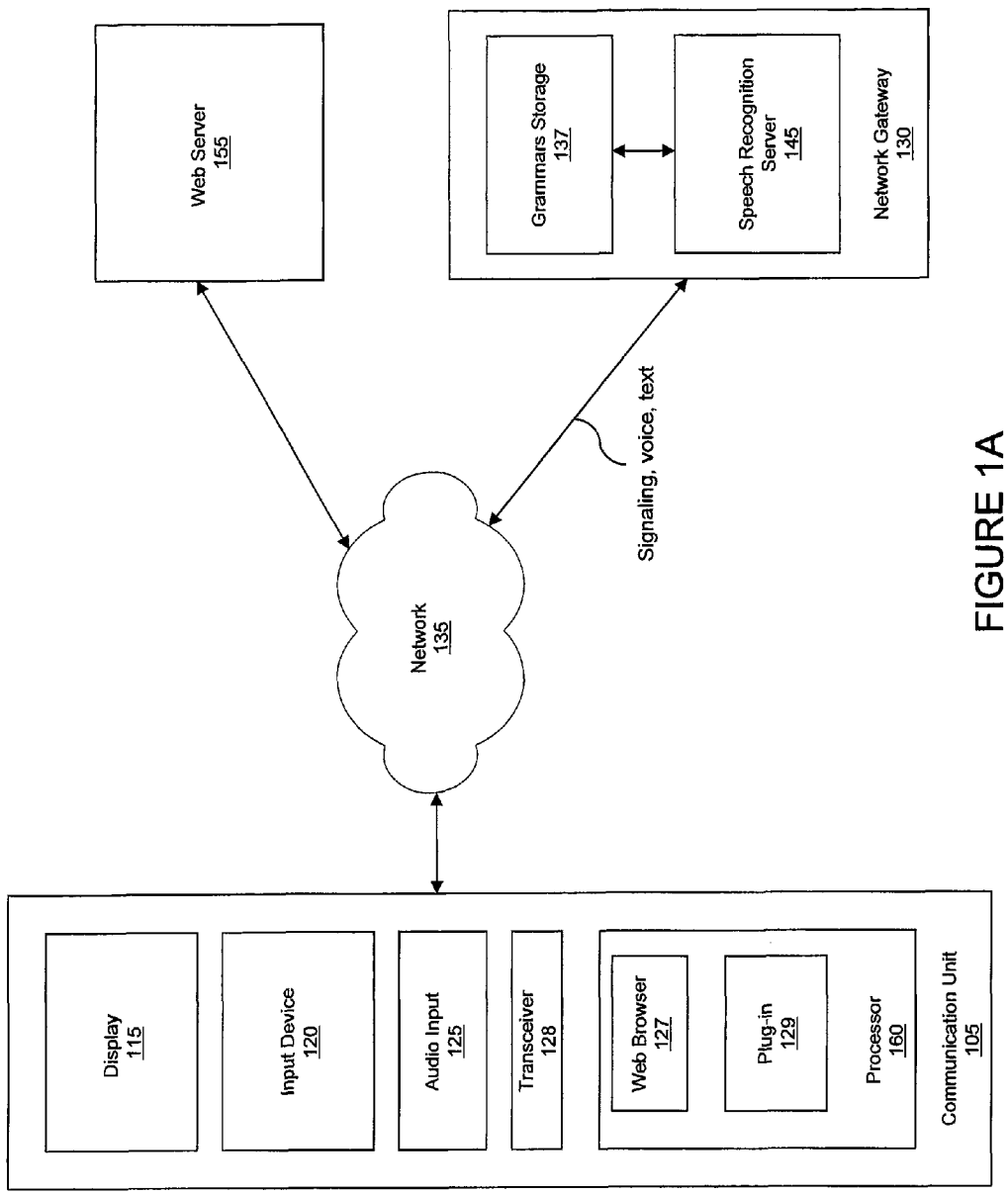
FIGS. 1A and 1B are block diagrams of exemplary systems in accordance with one aspect of the invention.

FIG. 1A is a block diagram of an exemplary system in accordance with the present invention. The system includes a communication unit 105 that communicates with a web server 155 over a network 135. Communication unit 105 can be any type of communication unit, including a wired or wireless communication unit, such as a telephone, personal digital assistant, desktop or laptop computer and/or the like. For example, communication unit 105 can be a wireless telephone that operates on a cellular macro network. Communication unit 105 includes display 115, input device 120, audio input 125, transceiver 128 and processor 160.

Display 115 can be any type of display capable of providing, among other things, a visual indication of documents received from web server 155. Although display 115 is illustrated as a component of communication unit 105, an external display can be coupled to communication unit 105 in addition to, or as an alternative to, a display being a component of communication unit 105. Input device 120 can be a keypad, keyboard, trackwheel, trackpad, mouse and/or the like for inputting information into communication unit 105. Audio input 125 can be, for example, a microphone for receiving any type of audible information, such as voice, recorded audio, or any other type of audio. Transceiver 128 can be any type of transceiver that is capable of allowing communication unit 105 to communicate with network 135.

Figure 2:
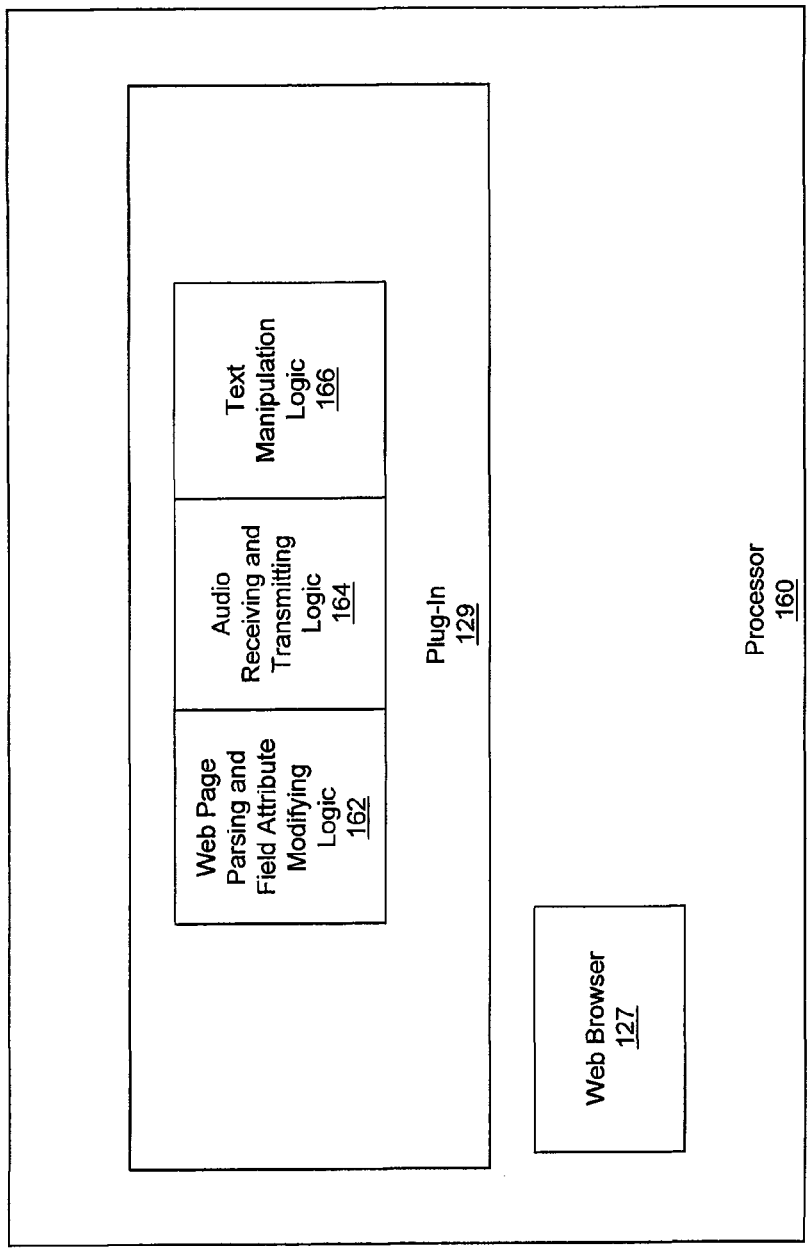
FIG. 2 is a block diagram of a communication unit processor in accordance with the invention.

Processor 160 includes web browser 127 and plug-in 129. Processor 160 can be a microprocessor, field programmable gate array (FPGA), and/or application specific integrated circuit (ASIC). When processor 160 is a microprocessor, the processor can load processor executable code from a memory for performing the functions of the elements illustrated as being included in the processor. Plug-in 129 can be a hardware and/or software component that includes processor-executable code for execution by processor 160. When plug-in 129 is a hardware component, it need not necessarily be a component of processor 160, but instead can be a separate component that interacts with processor 160. When the plug-in is a software plug-in, it can be a Java or Brew-based application or a browser extension. As illustrated in FIG. 2, plug-in 129 includes logic 162-166 for inputting received voice as text into form fields of a web page. The operation of logic 162-166 will be described in more detail below in connection with FIGS. 3a and 3b.

As FIG. 1A further shows, network gateway 130 is coupled to network 135, and includes speech recognition server 145 and grammars storage 137. Grammars storage 137 include grammars for particular form fields, and the grammars are associated with corresponding tags that are used to retrieve particular grammars. Network gateway 130 can be a component of a wired or wireless network.

The communication channel between communication unit 105 and the network gateway 130 can be established using any one of various known types of communication channels. For example, in one embodiment the speech can be transported over a channel setup between communication unit 105 and network gateway 130 using push to talk (PTT) signaling, in which case the speech transport channel is setup using a PTT signaling protocol. PTT provides a half duplex transport, i.e., a transport that allows for voice and/or data transmission in just one direction at a time. In an alternate embodiment, the speech can be transported over a Voice over Internet Protocol (VoIP) channel setup between communication unit 105 and network gateway 130 using Session Initiation Protocol (SIP) signaling, in which case the speech transport channel is setup using a SIP signaling protocol. A VoIP channel allows for routing of audible information over the Internet or through any other IP-based network. VoIP provides a two way full duplex channel, i.e., a channel that allows for simultaneous voice and/or data transmission in both directions. The words "speech" and "voice" can be used interchangeably in this description.

Figure 1B:
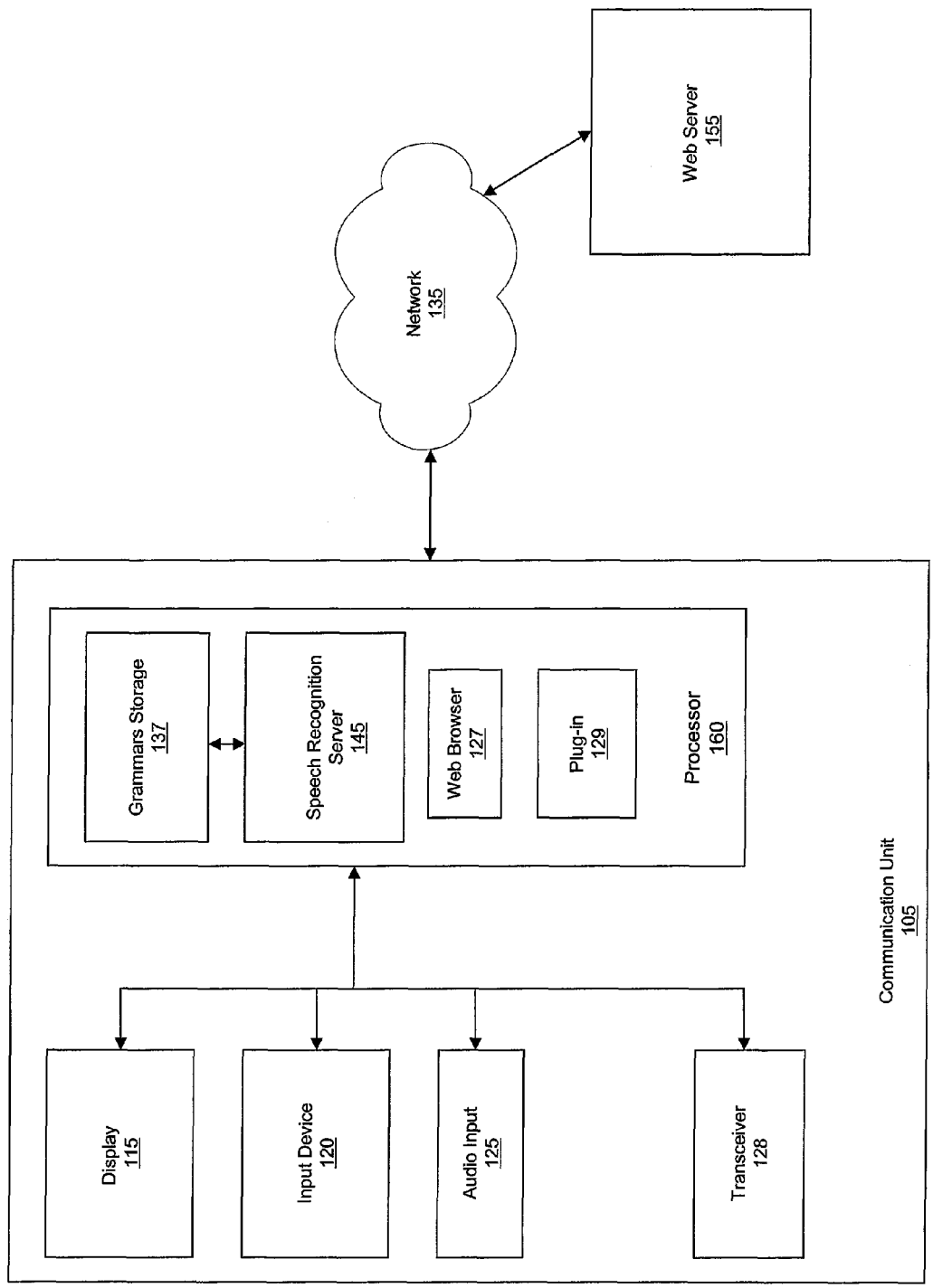

FIG. 1B is a block diagram of an exemplary system in accordance with another aspect of the present invention. In FIG. 1B the components of speech recognition server 145 and grammars storage 137 are components of processor 160 of communication unit 105. The functioning of the components of processor 160 is as stated with respect to FIG. 1A, except that the exchange of the voice signal inputted at audio input 125 to speech recognition server 145, and text from speech recognition server 145 to plug-in 129, takes place within the communication unit rather than over a network. Other components of communication unit 105 in FIG. 1B function as described with respect to FIG. 1A.

Figure 3A:
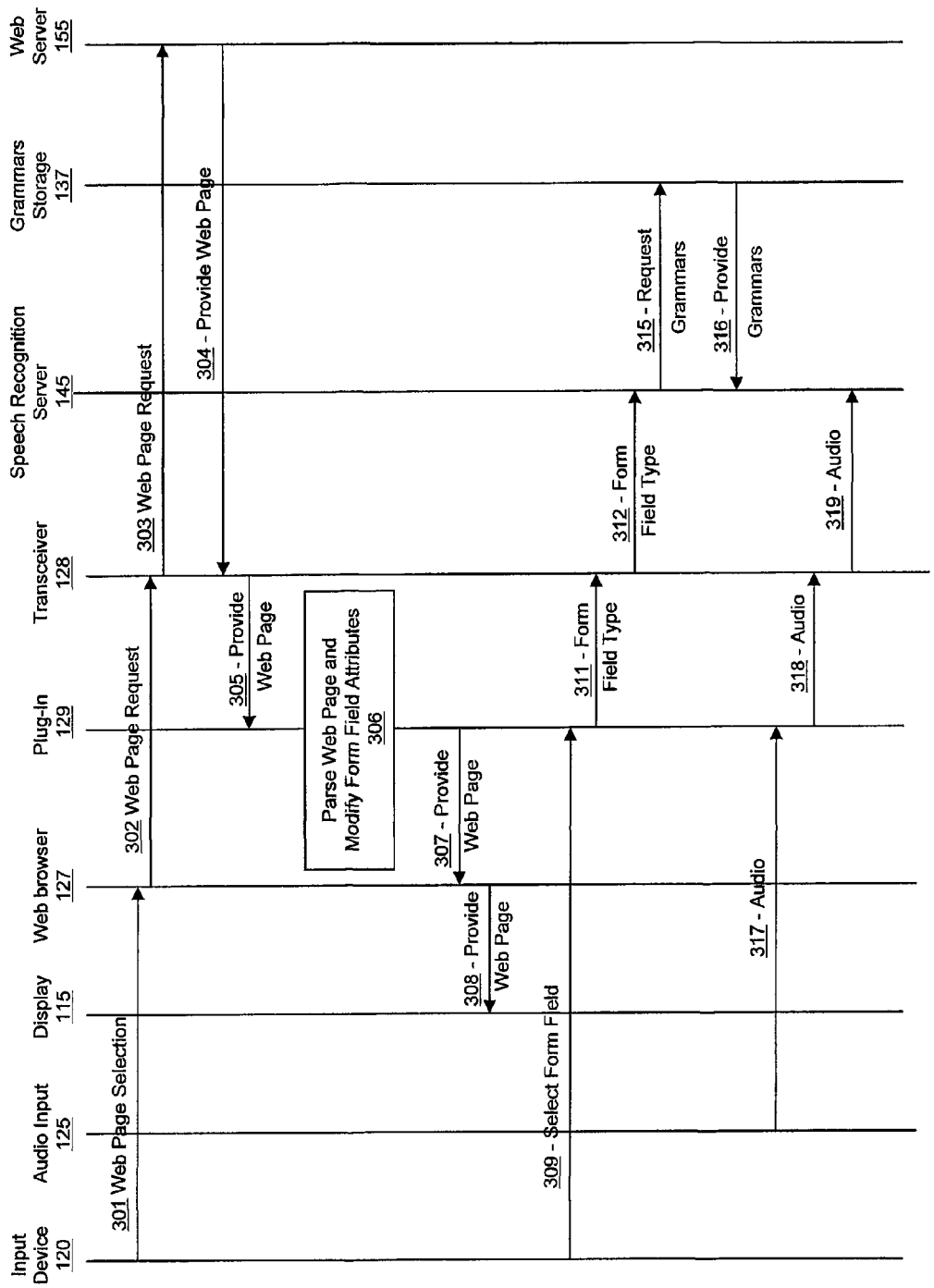
FIGS. 3a and 3b are call flow diagrams of an exemplary method in accordance with the present invention.
Figure 3B:
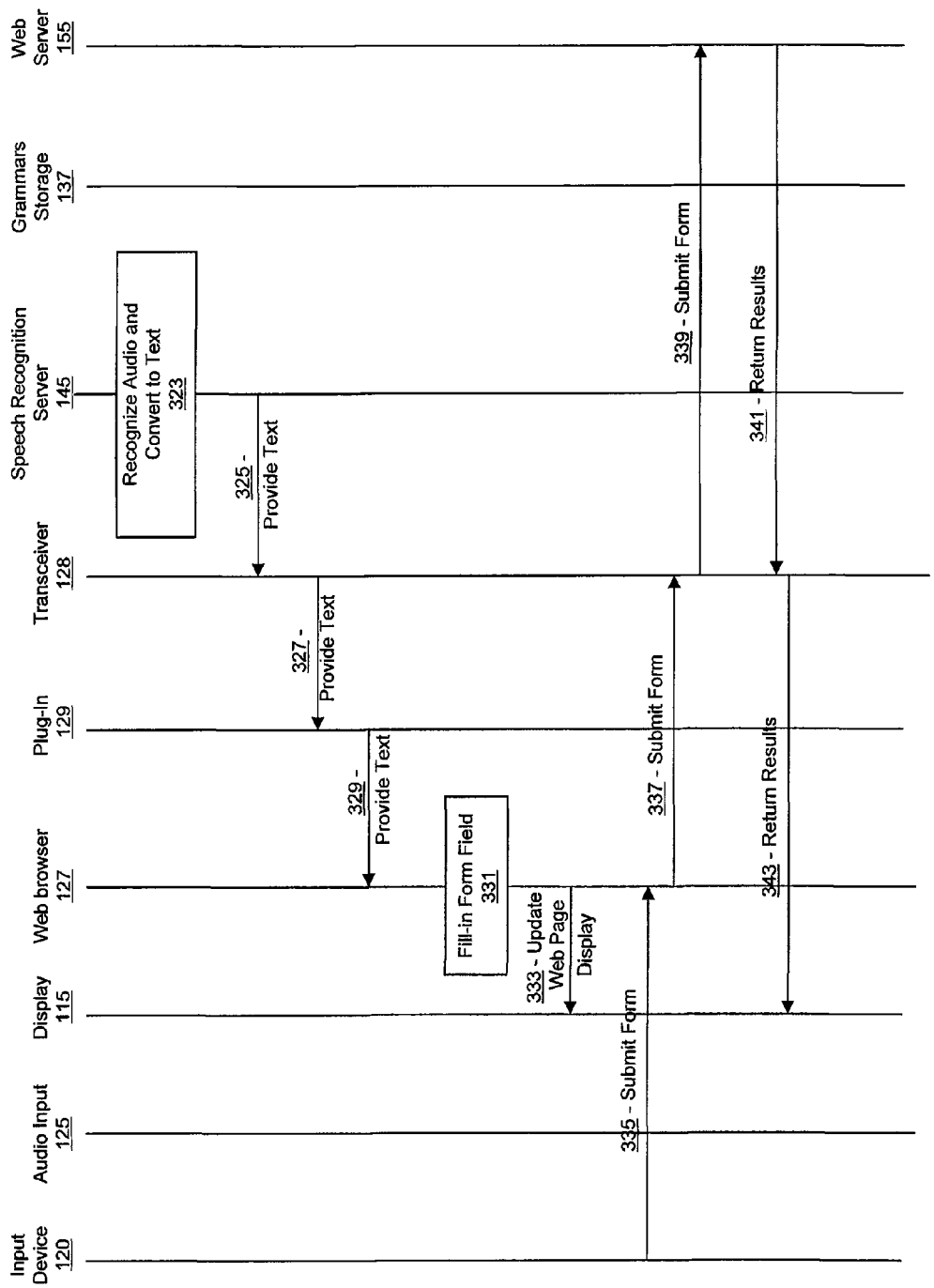

FIGS. 3a and 3b are call flow diagrams of an exemplary method in accordance with the present invention. Initially, a user of communication unit 105 selects a web page using input device 120, which then sends the selection to web browser 127 (step 301). Web browser 127 sends a web page request to transceiver 128 (step 302), which transmits the web page request to web server 155 (step 303). Web server 155 returns the requested web page to transceiver 128 (step 304), which then provides the web page to plug-in 129 (step 305).

Communication unit 105 has a "legacy" browser that is a non-voice enabled browser that recognizes only standard HyperText Markup Language (HTML). The browser does not understand the XHTML+Voice profiles that are required for a more spoken and visual interaction. Hence, during the loading of the web page the plug-in intercepts the page and once a form field is recognized on a web page, the plug-in formats the form field in accordance with the structure of the web page language, i.e. its syntax, that the legacy browser understands, which is the HTML format. The purpose of the syntax change is to give the user a visual indication that the form field has been voice enabled. Visual indications may included color coding, font changes, adding small image tags etc.

Continuing further with reference to the call flow diagram of FIG. 3a, as well as plug-in 129 in FIG. 2, logic 162 of plug-in 129 parses the web page, identifies form fields on the web page, and modifies attributes of those form fields that can be voice enabled (step 306). Logic 162 can identify form fields by identifying particular HTML tags in the web page. The attributes of the form fields that can be modified include, but are not limited to, a color of the form field, a font of text associated with the form field, the color or weight of a line for the form field, and/or adding an identifying symbol to the form field. Plug-in 129 then sends the web page with highlighted voice-enabled form fields to web browser 127 (step 307), which in turn provides the web page to display 115 (step 308).

The user then selects a form field to fill-in using input device 120, which provides the selection of the form field to plug-in 129 (step 309). Plug-in 129 identifies the form field type and sends a message with a tag that corresponds to the identified type to transceiver 128 (step 311), which forwards the message to speech recognition server 145 (step 312). Speech recognition server uses the tag to request a particular set of grammars from grammars storage 137 (step 315), which provides the grammars to speech recognition server 145 (step 316).

Plug-in 129 interjects itself between the input device and the browser. This allows the plug-in to know when and which form field a user selects. If the user selects a form field that was formatted/tagged by the plug-in (formatted and visually "tagged" to be recognized by the user as voice enabled), the plug-in takes control of the input and starts the process of voice recognition. However, if the user selects a form field that is not formatted or is un-tagged, then the plug-in transparently passes the user's input (a non-voice input) to the browser.

The use of particular tags for particular sets of grammars provides enhanced speech recognition capability. For example, particular tags can be used to retrieve grammars for form fields such as "name", "zip code", "telephone number", "address", etc.

Once the grammars are loaded into speech recognition server 145, an indicator (not illustrated) can be provided to the user of communication unit 105 to indicate that the system is ready to accept voice input. This indicator could be, for example, by a "go" signal appearing on display 115, or by an audible "beep", or by any other well known ways for giving such an indication to the user.

The user then provides audio to audio input 125, which in turn provides the audio to plug-in 129 (step 317). Logic 164 of plug-in 129 receives the audio and provides the audio to transceiver 128 (step 318), which sends the audio to speech recognition server 145 (step 319).

Turning now to FIG. 3b, speech recognition server 145 uses the loaded grammars to recognize the audio input signal, and converts the audio signal into corresponding text (step 323). Speech recognition server provides the text to transceiver 128 (step 325), which forwards the text to plug-in 129 (step 327). Logic 166 of plug-in 129 provides the text to web browser 127 (step 329), which fills the text into the form field (step 331) and updates the display of the web page (step 333). When the user is satisfied with the text in the form field, the user actuates input device 120, which requests that web browser 127 submit the form (step 335). Web browser 127 provides the form to transceiver 128 (step 337), which transmits the form to web server 155 (step 339). Web server 155 returns an appropriate result, if desired, such as an acknowledgement or the information requested, to transceiver 128 (step 341) which is routed within communication unit 105 to display 115 (step 343).

Although exemplary embodiments have been described in connection with documents retrieved from a web server, the present invention is equally applicable to documents retrieved from any type of server. The plug-in module of the present invention allows communication units that are not provided with voice-enabled web browsing to perform such web browsing, which is particularly advantageous due to the large number of communication units that are not provided with voice-enabled web browsing functionality. Moreover, because the plug-in does not actually convert the web pages into a voice enabled format, but instead modifies attributes of the web page and interacts with the browser and voice recognition server, the plug-in can be much smaller and simpler than a program that converts web pages into an X+V enabled format.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

We claim:

1. A method of filling-in a form field, the method comprising:
   receiving, by a processor, a web page with at least one non-voice enabled form field, wherein the processor comprises a non-voice enabled web browser that configures the processor to process the web page and a speech recognition server that configures the processor to convert voice information to text;
   receiving, by the processor, recorded voice information associated with one of the at least one non-voice enabled form field;
   processing, by the speech recognition server, the recorded voice information; and
   providing, by the speech recognition server to the web browser, text corresponding to the recorded voice information to fill-in the one of the at least one non-voice enabled form field.

2. The method of claim 1, further comprising:
   identifying, by the processor, the at least one non-voice enabled form field; and
   modifying an attribute of the at least one non-voice enabled form field.

3. The method of claim 2, wherein the attribute of the at least one non-voice enabled form field is at least one of a font of text associated with the form field, a color of a line to visually identify the form field, a weight of the line to visually identify the form field, a color of the form field, and a symbol to visually identify the form field.

4. The method of claim 1, wherein the web page is formatted using non-voice enabled hypertext markup language (HTML).

5. The method of claim 1, further comprising:
   identifying, by the processor, a type of the at least one non-voice enabled form field; and
   providing a tag associated with the identified type of the at least one non-voice enabled form field to the speech recognition server.

6. A communication unit, comprising:
   an audio input;
   a transceiver; and
   a processor coupled to the audio input and transceiver, the processor comprising:
      audio receiving and transmitting logic that receives audio from the audio input associated with at least one non-voice enabled form field of a web page and provides it to the transceiver for transmission to a speech recognition server; and
      text receiving and manipulating logic that receives text corresponding to the received audio and provides the received text to a non-voice enabled web browser to fill the at least one non-voice enabled form field.

7. The communication unit of claim 6, further comprising:
   a web page parsing and field attribute modification logic configured to receive a web page and identify a form field of the web page and a type of the form field,
   wherein the transceiver is further configured to transmits a tag associated with the identified type of the form field to the speech recognition server.

8. The communication unit of claim 7, wherein the web page is formatted using non-voice enabled hypertext markup language (HTML).

9. The communication unit of claim 7, wherein the web page parsing and field attribute modification logic is further configured to modify an attribute of the form field.

10. The communication unit of claim 9, wherein the attribute of the form field is at least one of a font of text associated with the form field, a color of a line to visually identify the form field, a weight of the line to visually identify the form field, a color of the form field, and a symbol to visually identify the form field.

11. The communication unit of claim 7, wherein the audio receiving and transmitting logic, the text receiving and manipulating logic, and the web page parsing and field attribute modification logic are components of a plug-in module embedded in the communication unit.

12. The communication unit of claim 11, wherein the plug-in module is a hardware module of the processor.

13. The communication unit of claim 11, wherein the plug-in module is a software module executable by the processor to control the processor.

14. The communication unit of claim 6, wherein the communication unit is a wireless communication unit.

15. The communication unit of claim 14, wherein the transceiver is configured to communicate with a cellular macro network.

16. The communication unit of claim 14, wherein a voice transport channel is setup using a push to talk signaling protocol.

17. The communication unit of claim 14, wherein a voice transport channel is setup using a session initiation protocol.

* * * * *